March 10, 1942.  L. R. RUNALDUE  2,275,866
PRESSURE ACTUATED RELAY
Filed July 17, 1940  2 Sheets-Sheet 1

Inventor:
Lewis R. Runaldue,
by Harry E. Dunham
His Attorney.

March 10, 1942.   L. R. RUNALDUE   2,275,866
PRESSURE ACTUATED RELAY
Filed July 17, 1940   2 Sheets-Sheet 2
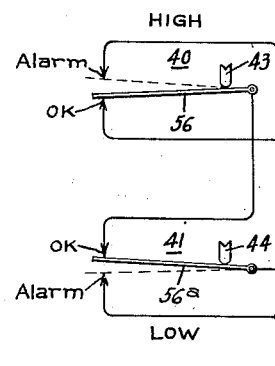
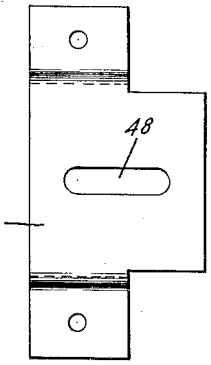
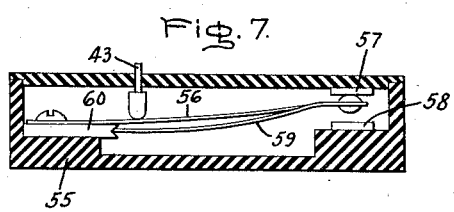
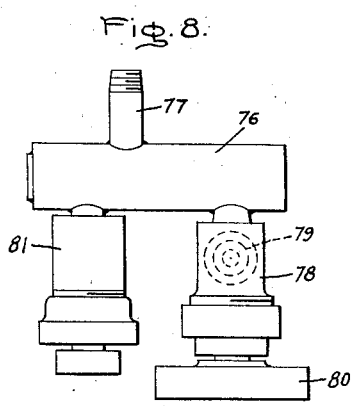
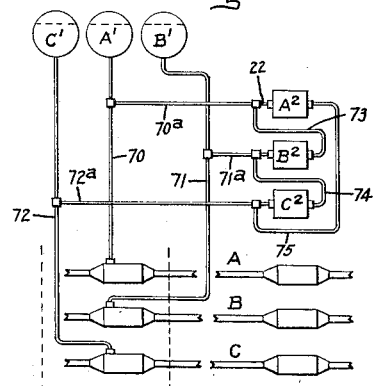
Inventor:
Lewis R. Runaldue,
by Harry E. Dunham
His Attorney.

Patented Mar. 10, 1942

2,275,866

UNITED STATES PATENT OFFICE 2,275,866

PRESSURE ACTUATED RELAY

Lewis R. Runaldue, Pittsfield, Mass., assignor to General Electric Company, a corporation of New York Application July 17, 1940, Serial No. 345,952

13 Claims. (Cl. 200—83)

The present invention relates to pressure actuated relays, one application of which is in connection with oil or other fluid filled cable installations for transmitting electric current for power purposes wherein it is important to cause a signal to be given at some distant selected station in the event of a predetermined decrease or increase in the pressure of oil or other fluid in a cable or in a reservoir connected to the cable or cables.

The object of my invention is the provision of an improved simplified pressure actuated relay, especially for use in connection with fluid filled cable installations and one which may be utilized by simple change for different types or kinds of such installations to thereby decrease the cost thereof.

For a consideration of what I believe to be novel and my invention, attention is directed to the accompanying description and the claims appended thereto.

Figure 1:
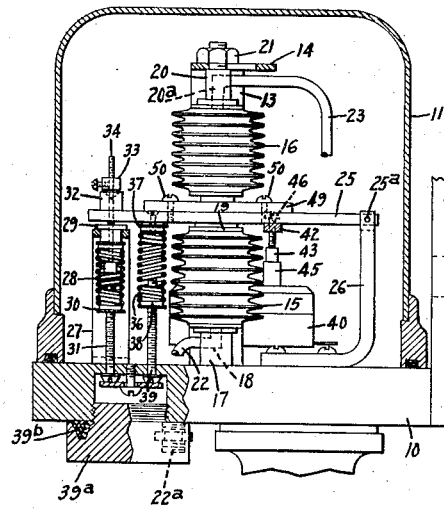
Figure 2:
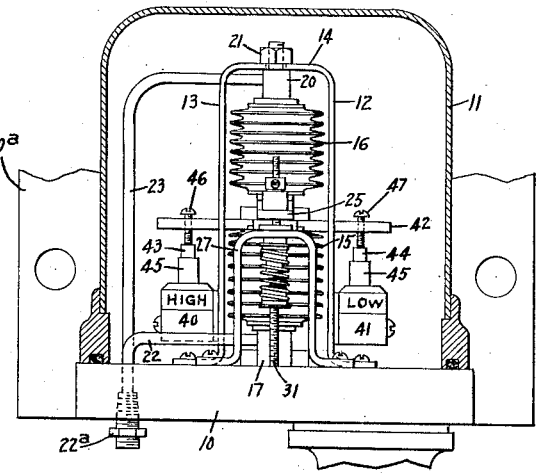
Figure 3:
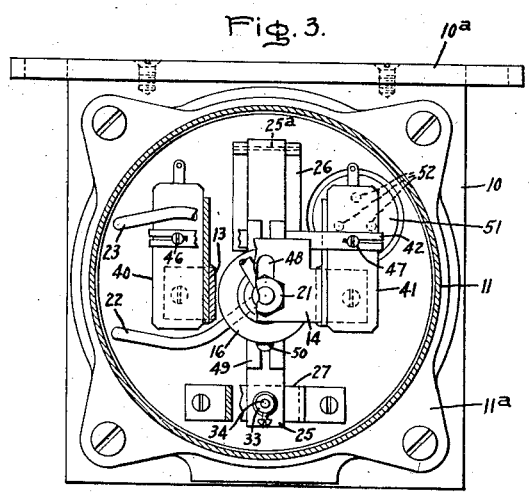
Figure 4:
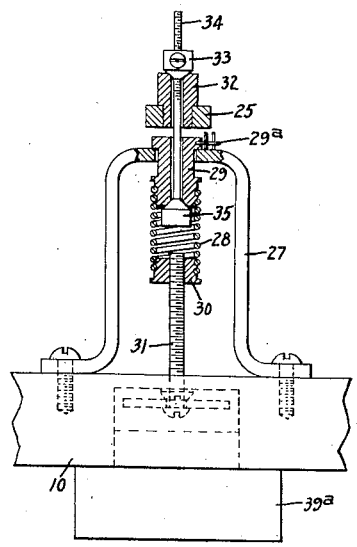

In the accompanying drawings which are illustrative of my invention, Fig. 1 is a view of my improved relay in side elevation; Fig. 2 is a view thereof in front elevation; Fig. 3 is a plan view thereof; Fig. 4 is a detail view; Fig. 5 is a diagram of the circuit connections thereof; Fig. 6 is a detail view showing a part of the means permitting adjustment of the upper bellows; Fig. 7 is a diagrammatic view of one of the switches; Fig. 8 is a detail view of a manifold for low pressure gas-filled cable installations, and Fig. 9 is a diagrammatic illustration of the relays when used for phase differential application.

Briefly stated my improved relay, in one case, is designed to cause a signal to be given at some selected distant point or station when the pressure of the oil or other fluid contained in a cable or in a supply reservoir therefor falls below a predetermined minimum or exceeds a predetermined maximum. To accomplish this, bellows diaphragms are employed and suitably connected to cables or cable reservoirs so that a change of pressure in the cables or cable reservoirs occasioned by a change of quantity of liquid therein causes the bellows to operate switches controlling a signal system, one switch actuating a signal when the pressure of liquid in the reservoir or cable is too high and the other when the pressure is too low. In all cable installations for which improved relay is especially intended the fluid contents of the cables are maintained at all times under positive pressure. A pressure of the order of 15 pounds per square inch is generally employed. For a more complete understanding of my invention and of the means for carrying it into effect, attention is directed to the following:

My invention is in the nature of an improvement and greatly simplified construction over the structures shown in my prior Patents 2,092,559 and 2,092,560 issued September 7, 1937.

In the drawings, 10 indicates the base of the relay instrument, and 11 the enclosing cover which is suitably packed or hermetically sealed to the base. The cover is held in place by lugs 11a secured to the base by screws, Fig. 3. It is to be noted that no gas or other fluid under pressure is contained in the casing, hence all that the casing does is to prevent foreign matter from having access to the working parts of the relay. The protection of all of the operating parts of the device is important because they are commonly located in manholes below the level of the street which usually contain a considerable amount of moisture and in relatively rare cases are flooded with water. The manholes may also contain gases which have a tendency to corrode the operating parts including the switch contacts. The base is provided with a back plate 10ª having openings to receive bolts by means of which the relay may be secured to a suitable support. Attention is particularly directed to the fact that all parts of the bellows are united by fusion of metal as distinguished from clamping them together with packings located between adjacent metal surfaces. Such an arrangement assures absolutely tight joints and hence freedom from leakage. On the base is mounted a main frame comprising two vertical legs 12 and 13, Fig. 2, each having a supporting foot at its lower end. The legs are connected by a top member 14. Desirably, the frame is made of strip or sheet metal, such as steel, and formed in one piece. Located within the frame are two axially aligned bellows diaphragms 15 and 16 having corrugated walls to increase the flexibility. The lower bellows is mounted on a support 17 which in turn is secured in the base. The support has a central passage 18, Fig. 1, communicating with the interior of the bellows 15, the support and bellows being carefully united, as by soldering, for example, to prevent outward leakage when the bellows is filled with fluid under positive pressure. The upper end of the bellows is closed by a head 19 which is desirably an integral part of the bellows to reduce the danger of leakage. The head may be formed by the metal of the bellows or by a separate piece soldered to the bellows. The upper bellows diaphragm is similarly constructed and is carried by a support 20 having a central passage 20ª, Fig. 1, communicating with the interior of the bellows to convey fluid thereto under positive pressure. The support is secured to the part 14 of the frame as by a nut 21, for example. Fluid under positive pressure is admitted to the lower bellows by the tube 22, and to the upper bellows by by the tube 23. These tubes are bent downwardly and pass through the base to the underside thereof for connection to other tubes or pipes leading to the cable reservoirs. 22ᵃ indicates suitable connectors secured to the underside of the base for this purpose. The upper and lower bellows desirably exert the same force for the same fluid pressure, but for some applications, one may exert a greater force than the other as by making the diameter of one greater than that of the other. For other applications, one of the bellows, for example, the upper one, may be moved with respect to the lower one so that an unbalanced effect due to a change of leverage on the parts actuated thereby may be obtained, as will appear later on.

Situated between the adjacent heads of the bellows and acted upon by both of them is a flat surfaced lever 25 that is pivoted at its rear end at 25ᵃ in a bracket 26 which is secured at its lower end to the base. The front end of the lever projects over a support or frame 27, Figs. 1 and 4, made in the form of an inverted U. Carried by the support is a coiled extension spring 28, the upper end of which is supported, as shown in Fig. 4, by a hollow sleeve 29 having a cylindrical flange normally resting on the top of the frame 27. The sleeve is capable of a small vertical movement and is prevented from turning by the pin 29ᵃ. The lower end of the sleeve has a coarse screw thread to engage and hold a few of the upper turns of the spring. The lower end of the spring is seated on a nut 30 which has a coarse screw thread to engage and hold a few of the lower turns of the spring. The nut itself is threaded on a rod 31 extending through the base 10. By turning the rod, the nut will be moved vertically thereon and thus the tension of the spring may be adjusted. Between the upper surface of the flange on the sleeve 29 and the underside of the lever 25 is a small clearance. To the upper side of the lever is fastened a tubular member 32 having a conical surface on its upper side for engagement with the beveled surface of a collar 33 which is adjustably mounted on the small screw threaded rod 34 and locked thereon in adjusted position by a small screw. The lower end of the rod has a head 35 which in the position shown engages the lower end of the sleeve. As the outer end of lever 25 is tilted upwardly, it exerts a pull on the rod and head 35 which in turn is resisted by the adjustable spring 28. The parts above described form a lost motion device. The spring 28 normally holds the flange of the tubular member 29 in contact with the top of support or frame 27 and when in this position, the spring exerts no effect on the lever 25. The distance between the collars 33 and 35 is such as to permit of a limited upward movement of the lever before it engages the upper collar and causes additional tension to be exerted by the spring 28 on the lever 25. The spring 28 adjusts the high pressure alarm setting.

Located between the support 27 and the bellows diaphragm is a vertically disposed main adjustable spring 36, the tension of which determines the low pressure setting. The upper end of the spring is attached to the lever 25 by a small round block 37, the latter having a coarse screw thread to receive and hold the upper end of the spring. The lower end of the spring is similarly supported by a block or nut 38 which is internally threaded to receive the adjusting screw 39 that is supported by the base and is accessible from below and hence permits adjustment of the relay without removing the casing. To prevent air from entering the hermetically sealed casing 11 around the screw threads of the adjusting screws 39, a screw threaded plug 39ᵃ is provided having a packing 39ᵇ.

The movements of the lever 25 are utilized to operate in alternation a pair of switches 40 and 41 located on opposite sides of the inverted U-shaped frame 12 and secured thereto by screws or other means. The switches control the circuit of a signal system terminating in some selected station at a point remote from the relay, the purpose of the signal being to indicate an abnormal condition at the reservoirs associated with the cable or within the cable itself. To this end, a cross bar or element 42 is secured to or formed integral with the lever 25 at some convenient place, as for example, in back of the frame 12. The movement of the lever at the place of attachment of the cross bar 12 is purposely made small and hence the switches should be of a character requiring only a small actuating movement. The movements of the lever and cross bar are desirably made as small as possible since by so doing the bellows will not be required to move as far and will therefore remain more constant in characteristic. The switches are operated in alternation by plungers 43 and 44, each located in a metallic guiding sleeve 45 and have a very small sliding movement within the sleeves, the latter being supported by the switch casings. Carried by the ends of the cross bar 42 are individual adjusting screws 46 and 47, which engage the tops of the plungers to permit of close adjustments.

Reference has been made to the fact that the upper bellows diaphragm may be adjusted with respect to the lower so that with similar diaphragms a greater force may be exerted on the lever 25 by one than by the other. For example, where the device is to be used as a phase differential pressure relay, the upper bellows may be so positioned that its effect is, for example, three quarters that of the lower diaphragm. This is an advantageous arrangement since it widens the application of the relay to different cable installations without having to substitute different bellows thereby decreasing the cost. To accomplish this, the upper end 14 of the main frame 12 is enlarged to extend rearwardly toward the pivot 25ᵃ of the lever 25 and formed therein is a slot 48, Figs. 3 and 6 in which the part 20 connected to the upper end of bellows 16 is movable. The part 20 is clamped in its adjusted position by the nut 21. To the lower end of the bellows is attached a flat plate or shoe 49 which rests on the lever and is secured thereto by screws 50. The ends of the plate or shoe are slotted so that by loosening the retaining screws, it can be moved toward and away from the lever pivot 25ᵃ, and then clamped in adjusted position. Thus any slight manufacturing errors in the areas of the bellows can be compensated for. The tube 23 admitting fluid to the bellows is made sufficiently flexible so this may be done without opening any tube joint; a feature which obviates trouble due to leakage. The construction is such that the upper bellows can be moved bodily with respect to the pivot 25ᵃ or the outer end may remain fixed and the inner end with the plate or shoe 49 moved slightly to take care of the case when, due to manufacturing errors, the area of the bellows is slightly different than it should be.

The above described arrangement is a valuable one for it permits of changing the operation of the relay in a very simple way without reconstruction. It may be done by relatively unskilled persons, and under some conditions may be done at the point of installation instead of returning the relay to the shop. In any event, a great saving in time and expense results.

In the base is an opening in which is located and sealed a disk 51, Fig. 3, of insulation containing three contact studs 52 to which the leads from the two switches are secured. The studs on the under side of the base are connected to the circuit wires of the signal system. When the relay controls direct current circuits, capacitors 53 and 54, Fig. 5, are employed to suppress arcing at the switch contacts when they interrupt the circuit. They may be located at any convenient place within the casing 11 and supported in any suitable manner whereby they are protected from injury.

The switches employed may be of any suitable or desired construction provided that only a very small movement of the actuator is required and that the contacts open and close with a snap action. In Fig. 7 is diagrammatically illustrated a type of switch on an enlarged scale suitable for the purpose. It comprises a base 55 of insulating material upon which is supported at one end a relatively long contact arm or member 56, the outer end of the arm moving between upper and lower stops or contacts 57 and 58, one or both of which may be in the electric circuit. In the present case both are in circuit at different times. To cause the arm to move with a snap action, a piece of spring material 59 is provided, one end of which engages an abutment 60, the other end being attached to the outer end of the arm 56. The switch arm or member normally stands with its free end in engagement with one of the stops or contacts, and is moved to its other position by movement of the plunger 43 or 44, Fig. 2, each of which is guided by the sleeve 45 supported by the closed casing of the switch. The arrangement of the spring 59 is such that the switch arm moves with a snap action in both directions when the plungers 43 and 44 are depressed or released. As shown more particularly in the circuit diagram, Fig. 5, the switch 40 is sensitive to abnormally high pressures, and switch 41 to abnormally low pressures. Figs. 1, 2 and 3 indicate clearly how small the switches and their respective casings are with respect to the other parts. It will also be noted that the adjusting screws 46 and 47 on the cross bar are practically in contact with the switch actuating plungers 43 and 44, and further that the total movement of the lever 25 is confined to a very narrow range which makes for accuracy of control. Because of the arrangement above described, the parts may be made small while fully effective to control the alarm circuit. Because the movements of the switch actuator are small, only a casing of minimum size is required.

In Fig. 5 is illustrated the circuit connections of the switches 40 and 41 and the signal or alarm circuit leading to a selected station which is usually at some considerable distance from the relay. In this figure, both switch members 56 and 56ᵃ are in the positions which they occupy when the pressures in the cables and reservoirs are normal. The contact member 56 responsive to high pressure is depressed by its actuator 43, and the contact member 56ᵃ responsive to low pressure is free of its actuator 44 and hence occupies its upper position. With the parts in the positions shown, the circuit is completed from wire 60 through the switch member 56 and 56ᵃ to the wire 61. In other words, both members are in O. K. positions, and a lamp or other signal device 63 in the closed circuit will indicate that the pressure conditions are satisfactory. Assuming that the pressure rises above the selected high limit, the cross-bar 42 of the main lever 25 will release the actuator of switch 40 and the contact member 56 will rise, as shown in dotted line, and close the alarm circuit. In other words, the circuit through wires 60 and 61 is opened and the circuit between wires 61 and 62 closed and the lamp or signal device 64 in circuit will become active. Assuming that the pressure falls below the selected low limit, the cross-bar 42 of the main lever 25 will depress the switch member 56ᵃ, as indicated by the dotted line, switch member 56 remaining in the full line position, the alarm circuit through wires 61 and 62 will be closed and the alarm signal 64 actuated. The circuit wires may be supplied with current by any suitable low potential source. It will be observed that the switch members 56 and 56ᵃ operate alternately. As previously stated, when direct current is used in the signal circuit, capacitances 53 and 54 are employed to reduce arcing at the contacts and also a resistance 65, having a value in this case of one-half ohm.

When used as a phase differential pressure relay, the lower bellows 15 will remain in the position shown. The upper bellows 16 will be moved back toward the pivot 25ᵃ of the lever so that the distance from its center to the pivot will be, for example, three quarters of the distance from the center of the lower bellows 15 to the pivot 25ᵃ. For this reason, the upper bellows 16 will operate exactly as it would if made smaller and aligned with the lower bellows. In other words, the upper bellows instead of being aligned with the lower and having three quarters of the effective area thereof will have the same area and its lever arm will be three quarters of that of the lower bellows. If the fluid pressures in both bellows are equal, the lower bellows because of its longer lever arm will overcome the force of the upper bellows and will keep the lower switch 41 of the diagram, Fig. 5, from operating.

Assuming the relay is adjusted for level ground and the pressure in the lower bellows 15 drops to three quarters of that in the upper bellows 16, the forces exerted by the two bellows acting jointly on the lever 25 will cause the switch 41 to operate. The spring of the metal of the bellows tends to oppose the force of the adjusting spring 28 so that if it is reduced to its lowest value, the spring in the bellows itself (and to some extent the springs in the two switches) will oppose the action of the upper bellows. Only one switch is needed when the relay is used as a phase differential relay but two are provided so that the relay may be used for other types of cable installations. When the relay is used as a phase differential pressure relay, the adjusting spring 28 will be completely tightened to prevent the second switch from operating. The spring 36 used for the differential pressure relay application adjusts the low pressure alarm setting. The spring 28 adjusts the high pressure alarm setting.

When the relay is used for gas filled cable installations, only the lower bellows 15 is required because the pressure measured is between the gas pressure within the cable and the atmosphere. In this case, the upper bellows 16 will be left in place but sealed off so as to be ineffective.

From what has been stated above, it will be noted among other possible uses that the improved relay is especially intended for the following applications by making only simple changes without reconstruction thereof:

1. Phase differential relay protection.
2. Differential pressure relay protection for use on balanced pressure reservoirs connected to three-conductor cables.
3. Gas filled cable protection.

As stated above, my improved relay is adapted for a variety of uses including a fluid filled cable system where a predetermined percentage change of fluid pressure existing in one cable with respect to that in another is caused through suitable circuits and controlled switch or switches to actuate a signal at some selected distant point. In Fig. 9 is shown one way that the relays may be connected to cables to accomplish this result. In carrying out this feature, the bellows diaphragms of each relay will first be so arranged that one of them, for example the upper one 16, is so adjusted with respect to the pivot 25ª of the main lever as previously described that its effective force is three-fourths that of the lower bellows 15. In this figure, A, B and C indicate single conductor high tension fluid filled cables, and A', B' and C' reservoirs for supplying fluid under predetermined positive pressure to the cables through the joint casings, the latter being located in manholes as indicated by the dotted lines. $A^2$, $B^2$ and $C^2$ indicate the relays which are associated with the cables and reservoirs. Reservoir A' is connected to cable A by the pipe 70 and to relay $A^2$ by the branch pipe 70ª which communicates with the pipe 22 opening into the lower bellows diaphragm 15. Reservoir B' is connected to cable B by pipe 71 and by branch pipe 71ª to the lower bellows diaphragm 15 of relay $B^2$, and reservoir C' is connected to cable C by pipe 72 and by branch pipe 72ª to the lower bellows diaphragm 15 of relay $C^2$. Pipe 70ª is also connected by pipe 73 to the upper bellows 16 of relay $B^2$; pipe 71ª is also connected by pipe 74 to the upper bellows 16 of relay $C^2$, and pipe 72ª is also connected by pipe 75 with the upper bellows 16 of relay $A^2$. With the parts connected as described, the relay will operate to give proper signals when there is a predetermined percentage difference of pressure between the fluid in one cable and its reservoir and that in another cable and its reservoir.

As previously stated, only one bellows is required when the relay is used in connection with cables filled with low pressure gas. A simple way to connect the relay for this purpose is illustrated in Fig. 8 wherein 76 indicates a manifold having on its upper side a short piece of pipe 77 that is adapted to be screwed into the base 10 in alignment with the lower end of the tube 22 communicating with the lower bellows 15. For this purpose, part 22ª, Fig. 2, may be removed and the pipe 77 substituted. 78 indicates a valve structure to which gas from the cable is admitted by pipe 79, shown in dotted lines, and 80 indicates the handle of a shut-off valve therein for controlling the admission of gas to the manifold and the bellows. In order to calibrate the relay without removing it from its position, a check valve 81 is provided for connection with an auxiliary source of gas under pressure. During calibration, the valve in part 78 is closed and the gas supplied to the bellows through the check valve 81 and suitable pipe. After the relay is calibrated, the supply of auxiliary gas is shut off and the shut-off valve opened by the handle 80 whereupon gas from the cable is free to enter the bellows.

When the relay is employed for the protection of cable systems having balanced pressure reservoirs, gas under pressure from a reservoir will be admitted to the upper bellows 16 through the pipe 23 and oil or other liquid under pressure from the reservoir will be admitted to the lower bellows 15 through the pipe 22. In my aforesaid Patent 2,092,559 various arrangements of cables and reservoirs are illustrated with which my improved and simplified relay may be employed.

What I claim as new and desire to secure by Letters Patent of the United States is:

1. In a device of the character described, the combination of a base, a frame mounted thereon, a pair of bellows diaphragms filled with fluid under positive pressure located within the frame, the lower bellows being supported directly by the base and the upper one by the frame, conduits extending upwardly through the base for supplying fluid to the bellows, a lever pivotally supported at one end on the base and extending between adjacent ends of the bellows and acted upon thereby, means accessible from the under side of the base for adjusting the action of the lever, a cross-bar carried by the lever, a pair of switches supported by the frame, one on each side thereof for controlling an electric circuit, and an actuator for each switch aligned with the cross-bar and moved thereby.

2. In a device of the character described, the combination of a base, a frame mounted thereon, a pair of bellows diaphragms filled with fluid under positive pressure located within the frame, the lower bellows being supported directly by the base and the upper one by the frame, a lever pivotally supported at one end by the base and extending between adjacent ends of the bellows and acted upon thereby, a spring continuously acting in opposition to certain movements of the lever, a second spring also acting on the lever, a lost motion connection between the lever and second spring which causes the spring to act on the lever only after it has moved a predetermined distance, and a pair of switches controlling an electric circuit and operated by the lever.

3. In a device of the character described, the combination of a base, a lever pivoted thereon, a pair of sealed bellows diaphragms filled with fluid under positive pressure arranged to act in opposition to each other on the lever, conduits supplying fluid to the bellows, means permitting one of the bellows to be adjusted toward and away from the pivot of the lever without opening the conduit to change the effective action of the bellows on the lever, and switches for controlling an electric circuit which are actuated by the lever.

4. In a device of the character described, the combination of a base, a lever pivoted thereon, a frame mounted on the base, first and second sealed bellows filled with fluid under positive pressure acting on the lever in opposition to each other, the first bellows being supported by the base and the second by the frame, a means carried by an end of the second bellows in engagement with the lever and adjustable longitudinally thereof, and a means forming a part of the second bellows at its opposite end and adjustably supported in the frame, and conduits supplying fluid to the bellows, the conduit supplying fluid to the second bellows being sufficiently flexible to permit of bodily adjustment thereof.

5. In a device of the character described, the combination of a base, a lever pivoted thereon, a frame mounted on the base, first and second sealed bellows filled with fluid under positive pressure acting on the lever in opposition to each other, the first bellows being supported by the base and the second by the frame, conduits supplying fluid to the bellows, a cross-bar carried by the lever, a pair of switches for controlling an electric circuit, located one on each side of the frame, and plungers for actuating the switches, each plunger being directly under and aligned with a portion of the cross-bar.

6. In a device of the character described, the combination of a pair of bellows diaphragms acting in opposition to each other, a pivoted lever extending between adjacent ends of the bellows, an adjustable coiled extension spring acting on the lever, supports for the spring located at its respective ends, one of the supports being hollow and the other adjustable to permit changing of the spring tension, a stationary member upon which the hollow support normally rests, a rod extending through the hollow support and lever, and first and second collars on the rod, the first collar being adapted for engagement with the lever and the second collar for engagement with the hollow support, the collars being so spaced that when the lever moves the rod and its cooperating collar more than a predetermined distance, the second collar engages the hollow support and moves it in a direction to impart additional tension to the spring to oppose further movement of the lever.

7. In a device of the character described, the combination of a base, a pair of bellows diaphragms acting in opposition to each other, supports therefor, conduits admitting fluid to the bellows, a pivoted lever extending between and engaging the ends of the bellows and moved thereby, a main spring acting on the lever to oppose movements thereof in opposition to the force exerted by one of the bellows, an electric switch actuated by the lever, and an adjustable spring for controlling the effective action of the lever on the switch which is normally ineffective but is brought into action to further restrain movement of the lever when it is moved by the joint action of the bellows more than a predetermined distance.

8. In a device of the character described, the combination of a base, a pair of differentially acting bellows diaphragms, supporting means therefor, a pivoted lever movable in response to the joint action of the bellows, an adjustable support for one of the bellows to permit of its being moved bodily toward or away from the pivot of the lever to change the effective action thereof on the lever, and a circuit controlling means actuated by the lever.

9. In a device of the character described, the combination of a pair of opposed bellows diaphragms of equal area, conduits conveying fluid under pressure to the bellows, one of which is relatively flexible, a pivoted lever extending between the opposed ends of the bellows, an adjustable supporting means for one of the bellows permitting it to be moved bodily with respect to the pivot of the lever without opening its conduit to cause the adjusted bellows to exert a greater or less effect on the lever, circuit controlling switches located one on each side of the lever, reciprocating actuators for the switches, and means carried by the lever for alternatively acting on the actuators.

10. In a device of the character described, the combination of a base, an hermetically sealed casing mounted on the base and enclosing the parts mounted thereon, a bellows diaphragm having a head integral with the wall thereof and mounted on the base, a support for the lower end of the bellows containing a fluid passage opening into the diaphragm, a tube communicating with the passage at one end and accessible at the other end through the base through which fluid is supplied without opening the casing, a pivoted lever engaged and moved by the head of the diaphragm, a bracket mounted on the base supporting the pivot of the lever, an actuating means carried by the lever and extending laterally therefrom, a spring acting on the lever in opposition to movements thereof in one direction, a circuit controlling snap switch supported by the base and located at one side of the lever, and a reciprocating actuator for the switch in vertical alignment with the actuating means and moved thereby as the lever moves on its pivot.

11. In a device of the character described, the combination of a base, a frame supported by the base, a pair of bellows diaphragms acting in opposition to each other, one of the bellows being secured at one end to the base and the other at its outer end to the frame, conduits admitting fluids under positive pressure to the diaphragms, a pivoted lever extending between the opposed ends of the bellows and acted upon thereby, an adjustable shoe attached to the inner end of one of the bellows and located between it and the lever to permit of adjustment of one end of the bellows toward or away from the pivot of the lever to correct for minor differences of areas of the two bellows, and a switch in a signal circuit actuated by movements of the lever.

12. In a device of the character described, the combination of a pair of bellows each having end heads integral therewith and defining with the bellows sealed chambers, the inner head of each bellows being movable, a separate conduit opening into each of the chambers for conveying fluid thereto, the conduits receiving fluid under positive pressure from different sources, a lever pivoted at one of its ends and extending between and engaged by the adjacent movable heads of the bellows and acted upon thereby, a spring and adjustable lost-motion device acting upon the lever in opposition to certain of its movements, a pair of switches located one on each side of the lever intermediate between its ends for controlling electric circuits, and actuators for the switches which are moved by the lever.

13. In a device of the character described, the combination of a base, a lever pivotally mounted thereon, a pair of sealed bellows diaphragms filled with fluid under pressure arranged to act in opposition to each other on the lever, the bellows having integral opposed heads, means for supporting the bellows at their outer ends, a shoe secured to the inner movable head of one of the bellows engaging the lever and adjustable toward and away from the pivot thereof without disturbing the support at the outer end of the bellows to compensate for minor differences in areas of the bellows, conduits supplying fluid to the bellows, and a switch for controlling an electric circuit actuated by the lever.

LEWIS R. RUNALDUE.